March 16, 1948.     J. D. MANN     2,437,750
SHEAR TESTING DEVICE
Filed July 11, 1944
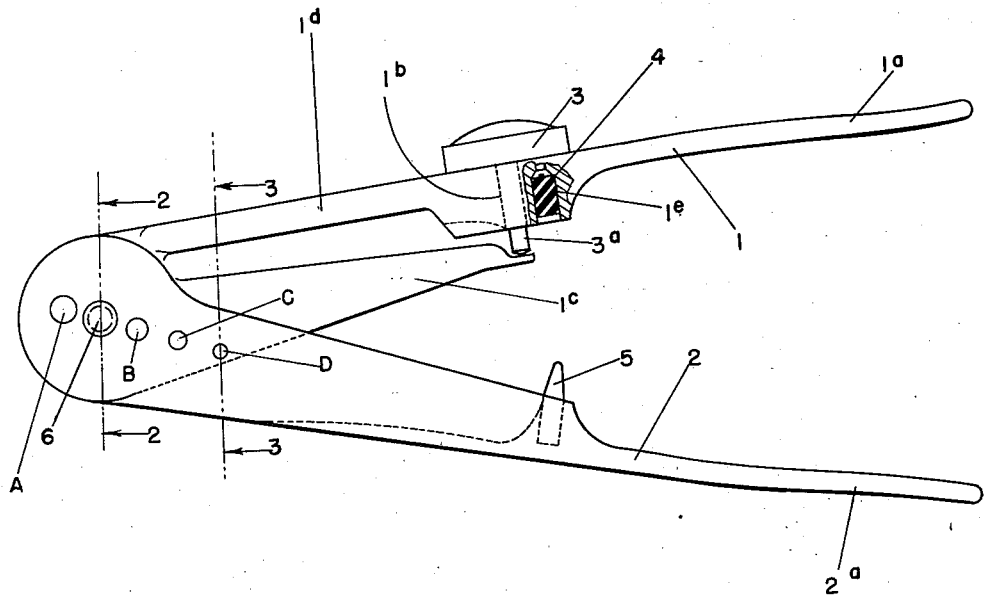
FIG 1
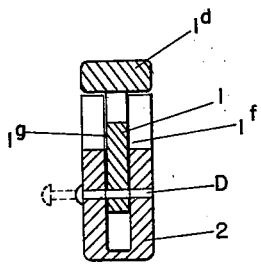 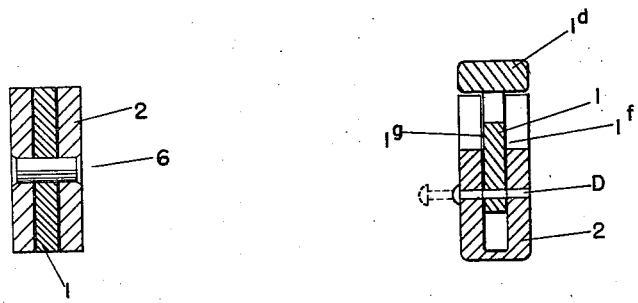
FIG. 2     FIG. 3
*INVENTOR.*
JOHN DANIEL MANN
BY *A. B. Bowman*
*Attorney*

Patented Mar. 16, 1948

2,437,750

UNITED STATES PATENT OFFICE 2,437,750

SHEAR TESTING DEVICE

John Daniel Mann, National City, Calif.

Application July 11, 1944, Serial No. 544,440

4 Claims. (Cl. 73—101)

My invention relates to a shear testing device, more particularly for use in testing rivets, or the like, and the objects of my invention are:

First, to provide a testing device of this class which is manually operated and accurately indicates the shear strength of rivets or other similar objects;

Second, to provide a testing device of this class which will shear rivets when the handles thereof are squeezed by a person's hand providing a very simple and compact device for manual shear tests;

Third, to provide a testing device of this class in the form of a hand tool in which the deflection of a portion thereof accurately indicates the shear strength of rivets being tested thereby;

Fourth, to provide a testing device of this class in which various sized rivets or other objects may be tested with the application of a certain amount of pressure for all of the various sized rivets or other objects;

Fifth, to provide a testing device of this class combining the accuracy of the dial indicator with the compact simple features of a manual testing device; and Sixth, to provide a testing device of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application in which:

Figure 1 is a side elevational view of my shear testing device showing portions broken away and in section to facilitate the illustration; Fig. 2 is a transverse sectional view taken from the line 2—2 of Fig. 1 and Fig. 3 is a transverse sectional view taken from the line 3—3 of Fig. 1.

Similar characters of reference refer to similar parts and portions throughout the several views of the drawings:

The handle members 1 and 2, dial gage 3, stop members 4 and 5 and the axle 6 constitute the principal parts and portions of my shear testing device.

The handle members 1 and 2 are provided with engaging portions 1a and 2a which diverge from the axle 6 which extends through opposite ends of the handle members 1 and 2 providing the pivotal axis on which the handle members 1 and 2 hinge. The handle member 1 is provided with a bore 1b through which extends the plunger stem 3a of the dial gage 3. Integral with the handle member 1 is an arm portion 1c which contacts the plunger 3a of the dial gage 3. The handle members 1 and 2 are provided with holes A, B, C and D which extend through the handle members 1 and 2, as shown in Fig. 1 and Fig. 3 of the drawings. These holes A, B, C and D vary in size in order to receive various sized rivets or other objects to be shear tested. It will be noted that the smaller holes are further from the axis of the handle members 1 and 2 than are the larger holes. Thus the leverage ratio compensates for the shear strength of the different sized rivets being tested.

The handle member 1 is provided with a flexing portion 1d, as shown best in Fig. 1 of the drawings. The handle member 1 is also provided with a recess portion 1e in which is positioned a resilient rubber stop member 4 opposing the protruding stop member 5 secured in connection with the handle member 2.

The operation of my shear testing device is substantially as follows: When it is desired to test the ultimate shear strength of a rivet it is placed in one of the holes A, B, C or D in which it fits snugly. The handle portions 1a and 2a are grasped in the operator's hand and forced together. A rivet is in shear at opposite sides 1f and 1g of the handle member 1, as shown best in Fig. 3 of the drawings. If it is desired to perform single shear test of a rivet the rivet is inserted only past one side 1g or 1f as shown by dash lines in Fig. 3 so that the rivet is in shear in only one place. As the pressure is applied, the flexing portion 1d of the handle member 1 is deflected causing the plunger portion 3a of the dial gage 3 to press against the arm portion 1c of the handle member 1. This plunger 3a operates the dial gage which indicates the pressure being applied by the operator. The operator watches the dial gage 3 and notes the pressure applied when the rivet fails in shear. Thus the operator is able to determine very quickly and easily the strength characteristics of the rivet due to heat treating or other processing.

It will be noted that the flexing portion 1d is deflected relatively to the arm 1c so the dial gage 3 will indicate very accurately the shear stress set up in the rivet during the test thereof.

Though I have shown and described a particular construction, combination and arrangement of parts and portions, I do not wish to be limited to this particular construction, combination and arrangement, but desire to include in the scope of my invention the construction, combination and arrangement, substantially as set forth in the appended claims.

Having thus described my invention, what I claim as new and desire to secure by Letters Patent is:

1. In a shear testing device of the class described, the combination of two handle members having hub portions hinged together, one of said handle members having an integral arm portion extending from the hub of said handle member and having a resilient portion to permit flexing thereof relative to the arm portion, a dial gage secured on said handle member and engaging said arm portion, and having rivet shearing holes extending through the hub portion of both of said handle members positioned in spaced relation from the axis of the hinge of said handle members.

2. In a shear testing device of the class described, the combination of first and second handle members each having a hub portion, an axle extending through said handle members at said hub portions and forming a hinge therefor, said first handle member provided with an arm portion integral therewith and having a resilient portion to permit flexing thereof relative to the arm portion, a dial gage mounted on said first mentioned handle member operably engageable with said arm portion, and having rivet shearing holes extending through both of said handle members in spaced relation from said axle.

3. In a shear testing device of the class described, the combination of first and second handle members each having a hub portion, an axle extending through said handle members and forming a hinge therefor, said first handle member provided with an arm portion integral therewith and having a resilient portion to permit flexing thereof relative to the arm portion, a dial gage mounted on said first mentioned handle member operably engageable with said arm portion, and having rivet shearing holes extending through both of said hub portions in said handle members in spaced relation from said axle, one of said handle members having a recess portion filled with resilient material, the other handle portion having a protruding stop member positioned in opposed aligned relation with said resilient material.

4. In a shear testing device, the combination of a pair of members hinged together, an arm portion on one of said members and said member having a resilient portion to permit flexing relative to the arm portion, an indicator on the member carrying said arm portion engageable with said arm portion, and said members being provided with shearing holes spaced from the hinge axis.

JOHN DANIEL MANN.

REFERENCES CITED

The following references are of record in the file of this patent:

UNITED STATES PATENTS

| Number | Name | Date |
| --- | --- | --- |
| 833,294 | Blaum | Oct. 16, 1906 |
| 1,293,189 | Piper | Feb. 4, 1919 |
| 1,319,689 | Bernecker | Oct. 28, 1919 |
| 1,329,192 | McAdam, Jr. | Jan. 27, 1920 |
| 2,002,495 | Falk | May 28, 1935 |
| 2,292,204 | Cross | Aug. 4, 1942 |
| 2,368,757 | Graham | Feb. 6, 1945 |

FOREIGN PATENTS

| Number | Country | Date |
| --- | --- | --- |
| 437,133 | Germany | Nov. 15, 1926 |
| 680,236 | Germany | Aug. 25, 1939 |